United States Patent
Yenganti et al.

(10) Patent No.: US 9,078,210 B2
(45) Date of Patent: Jul. 7, 2015

(54) SYSTEMS AND METHODS FOR POWER SAVING FOR MULTICAST AND BROADCAST DATA

(71) Applicant: QUALCOMM Incorporated, San Diego, CA (US)

(72) Inventors: Pradeep K. Yenganti, Hyderabad (IN); Deepak Jindal Kumar, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 107 days.

(21) Appl. No.: 13/761,733

(22) Filed: Feb. 7, 2013

(65) Prior Publication Data

US 2014/0219147 A1    Aug. 7, 2014

(51) Int. Cl.
| | |
|---|---|
| H04W 4/00 | (2009.01) |
| H04W 52/02 | (2009.01) |
| H04W 4/08 | (2009.01) |
| H04W 76/04 | (2009.01) |

(52) U.S. Cl.
CPC ........ *H04W 52/0206* (2013.01); *H04W 76/048* (2013.01); *Y02B 60/50* (2013.01); *H04W 4/08* (2013.01)

(58) Field of Classification Search
USPC ......................................... 370/328
See application file for complete search history.

(56) References Cited

U.S. PATENT DOCUMENTS

| | | | |
|---|---|---|---|
| 7,061,879 B2 | 6/2006 | Oprescu-Surcobe et al. | |
| 7,881,755 B1 | 2/2011 | Mishra et al. | |
| 8,040,839 B2 * | 10/2011 | Kakumaru et al. | 370/328 |
| 8,089,908 B2 * | 1/2012 | Wentink | 370/311 |
| 2007/0248034 A1 * | 10/2007 | Hsu et al. | 370/318 |
| 2007/0291681 A1 * | 12/2007 | Jokela et al. | 370/328 |
| 2008/0151814 A1 * | 6/2008 | Jokela | 370/328 |
| 2009/0010191 A1 | 1/2009 | Wentink | |
| 2010/0265864 A1 | 10/2010 | He et al. | |
| 2012/0063335 A1 | 3/2012 | Cho et al. | |

FOREIGN PATENT DOCUMENTS

EP    1684465 A1    7/2006

OTHER PUBLICATIONS

International Search Report and Written Opinion—PCT/US2014/014384—ISA/EPO—Apr. 2, 2014.

* cited by examiner

*Primary Examiner* — Chi H Pham
*Assistant Examiner* — Fahmida Chowdhury
(74) *Attorney, Agent, or Firm* — Bay Area Technology Law Group PC

(57) ABSTRACT

Systems and methods are disclosed for wireless communication including transmitting a beacon comprising group traffic information indicating whether group traffic is buffered for transmission and multicast/broadcast (MB) information indicating a type of the buffered group traffic with a first node. The beacon may be received by a second node, allowing the type of the buffered group traffic to be determined from the MB information. Types of buffered group traffic include multicast data, broadcast data and both multicast and broadcast data. As desired, the second node may enter a power save mode of operation upon determining that the type of buffered group data is not currently of interest.

20 Claims, 5 Drawing Sheets

SYSTEMS AND METHODS FOR POWER SAVING FOR MULTICAST AND BROADCAST DATA

FIELD OF THE PRESENT INVENTION

This disclosure generally relates to wireless communication systems and more specifically to systems and methods for conserving power while coordinating delivery of multicast and broadcast data.

BACKGROUND OF THE INVENTION

The power saving mode of a station associated with an access point in a wireless local area network (WLAN) operating under IEEE 802.11 standards may be coordinated through the use of the traffic indication map (TIM) information element (IE) contained in the periodic beacons transmitted by the access point. Data transmitted by the access point may be characterized based upon whether the traffic is directed to a single station or to a group of stations. For example, unicast traffic includes packets addressed to a single station within the WLAN, while group traffic includes multicast data that is addressed to a plurality of stations, broadcast data that is addressed to all stations or both multicast data and broadcast data.

Each beacon transmitted by the access point includes TIM information regarding unicast traffic, allowing a station to determine whether to poll the access point to initiate transfer of data that has been buffered. Delivery of group traffic, on the other hand, is not initiated by the stations. Rather, a subset of the beacons, known as delivery TIM (DTIM) beacons, are transmitted at a periodicity advertised by the access point and may be used to indicate that group traffic has been buffered at the access point and will be transmitted following the DTIM beacon. Accordingly, a station typically will be configured to awaken in order to receive the DTIM beacon and may remain awake to receive the data when the DTIM beacon indicates there is buffered group traffic.

However, situations may exist wherein a station may want to receive only one type of group traffic, either multicast data or broadcast data, but not both. A DTIM beacon conforming to 802.11 standards does not distinguish between types of group traffic. Thus, the station may need to stay awake to receive the group traffic since it may be unable to determine from the DTIM beacon whether the data buffered corresponds to multicast or broadcast data, even though the traffic may be of a type that is not currently of interest. Consequently, the power consumed by the station during reception of the group traffic may represent an unnecessary expenditure. A station may have a limited power supply, as exemplified by battery-powered mobile stations such as smartphones, making it desirable to avoid power consumption that does not contribute to the overall performance of the station.

Accordingly, there is a need for systems and methods for coordinating delivery of multicast and broadcast data in a manner that conserves power. Further, there is a need for distinguishing between multicast and broadcast traffic to allow a station to avoid receiving an unwanted type of group traffic. This disclosure satisfies these and other needs.

SUMMARY OF THE INVENTION

This specification discloses systems for wireless communication including an access point having a beacon generator, wherein the beacon generator may generate a beacon for periodic transmission, such that the beacon has group traffic information indicating whether group traffic is to be transmitted and multicast/broadcast (MB) information indicating a type of the group traffic. Further, the beacon may be a delivery traffic indication map (DTIM) beacon to include the group traffic information. For example, the group traffic information comprises one bit of a traffic indication map (TIM) information element (IE).

In one aspect, the MB information may be two bits of an MB information element (IE). Further, the MB information may identify the type of the group traffic as multicast data, broadcast data or a combination of both.

The systems of this disclosure also include a station having a filter, wherein the station may be configured to receive a beacon from an access point comprising group traffic information indicating whether group traffic is to be transmitted and MB information indicating a type of the group traffic and wherein the filter may be configured to determine the type of the group traffic from the MB information. In one aspect, the beacon comprises a delivery traffic indication map DTIM beacon to include the group traffic information. Further, the group traffic information may be one bit of a TIM IE.

In another aspect, the MB information comprises two bits of an MB IE. Further, the filter may identify the type of the group traffic as multicast data, broadcast data or a combination of both from the MB information. As desired, the filter may be implemented in hardware.

Additionally, the station may be configured to enter a power save mode of operation when the filter determines from the MB information that the type of the group traffic is a first type. The first type may be multicast data or broadcast data.

This disclosure also includes methods for wireless communication, including the steps of transmitting a beacon having group traffic information indicating whether group traffic is to be transmitted and MB information indicating a type of the group traffic. Further, the methods may include receiving the beacon with a second node and determining the type of the group traffic from the MB information.

Another suitable method for a wireless receiver may include the steps of receiving from a transmitter a beacon comprising group traffic information indicating whether group traffic is to be transmitted to the receiver and multicast/broadcast (MB) information indicating a type of the group traffic and determining from the MB information the type of the group traffic. In one aspect, the beacon may be a DTIM beacon including group traffic information. For example, the group traffic information may be one bit of a TIM IE.

In another aspect, the MB information may be two bits of an MB IE. Further, determining the type of the group traffic may include identifying the type as multicast data, broadcast data or a combination of both.

Yet another aspect of the methods includes determining from the MB information that the group traffic is a first type and placing the wireless receiver in a power save mode of operation in response to determining the type of the group traffic as the first type.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
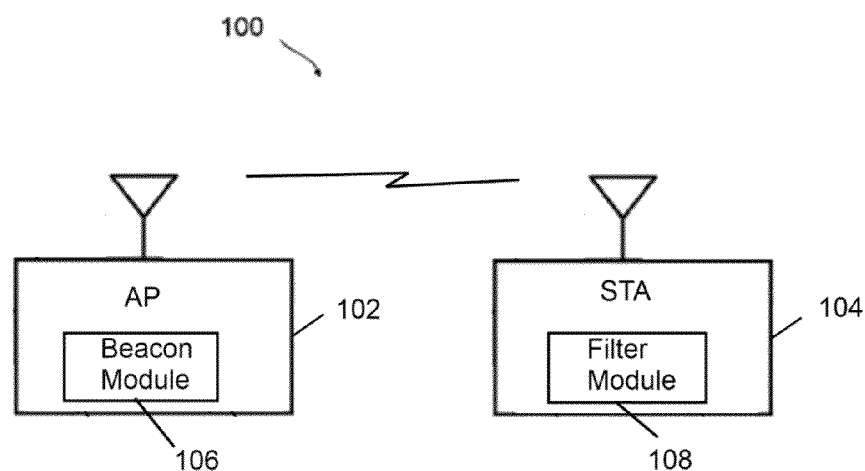
FIG. 1 depicts a wireless communication system, according to one embodiment of the invention.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Further, embodiments are discussed in specific reference to wireless networks. As such, this disclosure is applicable to any suitable wireless communication systems having the necessary characteristics. Although discussed in specific reference to an infrastructure WLAN, the techniques of this disclosure may be applied to other network configurations or to other wireless communication systems involving periodic beacon transmissions for coordinating delivery of traffic to client devices. Further, the access point functionality involving such beacon transmissions may be embedded in other devices of an information handling system such as, for example, routers, switches, servers, computers, or the like, and the designation as an access point is not limited to dedicated access point devices.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a", "an" and "the" include plural referents unless the content clearly dictates otherwise.

As noted above, conventional 802.11 protocols utilize DTIM beacons to signal stations that group traffic (including multicast, broadcast data or both) has been buffered at the access point and will be sent following the DTIM beacon. Conventionally, the presence of pending group traffic is indicated using a single bit and no distinction is made between multicast and broadcast data. The techniques of this disclosure may be used to coordinate operation between the access point and one or more stations to allow discrimination between the different types of group traffic so that a station configured to receive one type of traffic but not another may either remain awake to receive the buffered data if the pending traffic corresponds to a desired type or transition to a power save state if the pending traffic does not correspond to a desired type. Since the station need not actively receive the subsequently transmitted buffered traffic if not desired, power consumption may be reduced.

These systems and methods are described in reference to an exemplary wireless communication system 100 as shown in FIG. 1, which includes a first node acting in an access point role, AP 102, and a second node acting in a station role, STA 104. Although discussed in reference to a WLAN, these techniques may also be applied to other network architectures having analogous aspects. Operation of AP 102 in wireless communication system 100 includes the periodic transmission of beacon management frames. The beacon is used to communicate parameters regarding operation of wireless communication system 100, including identification information, supported rates, timing information and the like. The time interval between the start of two consecutive beacons is called a beacon interval and may be used to establish a target beacon transmit time (TBTT). The beacon interval may be fixed or variable and may be set to a suitable duration (e.g., 100 msec).

In one aspect, AP 102 includes beacon generator 106 that may be configured to control the generation and transmission of beacons, for example, with regard to beacons used to indicate that group traffic has been buffered and will be transmitted following the beacon. Beacon generator 106 may also be configured to generate beacons that identify the group traffic as including multicast data, broadcast data or both. Further, STA 104 may include filter 108 configured to determine from the received beacons whether group traffic will be transmitted by AP 102 and whether the group traffic will include multicast data, broadcast data or both. As will be described below, in one embodiment, it may be desirable to implement filter 108 at a hardware level in STA 104. But in other embodiments, the filter 108 may be implemented through use of firmware, software, hardware, or a combination of any of the aforementioned.

Figure 2:
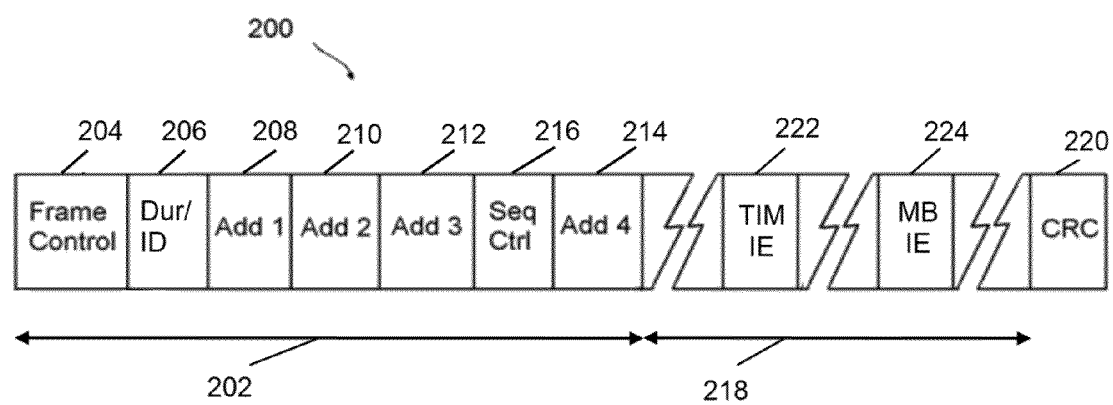
FIG. 2 schematically depicts the format of a DTIM beacon, according to one embodiment of the invention.

An example of a generalized beacon frame 200 having a format corresponding to IEEE 802.11 standards is depicted in FIG. 2. Frame 200 includes a MAC header 202, containing the frame control 204, duration/ID 206, address fields 208, 210, 212 and 214 and sequence control field 216. Frame 200 further includes a variable length frame body 218 and cyclic redundancy check (CRC) field 220. Frame control 204 segment of MAC header 202 includes fields providing various types of control information, including an identification of the 802.11 protocol of the frame, the type and subtype of the frame, distribution system information, information regarding additional information to be transmitted, security and order information. CRC field 220 may be employed to provide a frame check sequence (FCS) function.

Frame body 218 may be used to convey information and operational parameters regarding wireless communication system 100 and may include fields required by 802.11 standards as well as optional vendor-specific information elements. In particular, frame body 218 may include group traffic information in the form of TIM IE 222. In current standards (but may not be required in the future), TIM IE 222 is typically the sixth element of frame body 218 and contains a number of fields to help coordinate power save modes with associated stations, such as STA 104, by communicating the presence or absence of buffered unicast and group traffic. For unicast traffic, a virtual bitmap is used to indicate the presence or absence of buffered data for each associated station. Parameters associated with DTIM beacons are communicated using the DTIM Count, which indicates the number of beacons that will be sent before the next DTIM beacon, and the DTIM period, which indicates the number of non-DTIM beacons between DTIM beacons. TIM IE 222 also includes a bitmap control field, with the first bit used to signal the presence or absence of buffered multicast or broadcast data. As described above, the use of a single bit may not allow a distinction between multicast and broadcast data.

According to techniques of this disclosure, frame body 218 may also include multicast/broadcast (MB) information in the form of Multicast/Broadcast (MB) IE 224. Under 802.11 specifications, frame body 218 may include a plurality of proprietary information elements that may be vendor-defined, any of which may be employed as MB IE 224. Notwithstanding, a new MB IE 224 may be defined and incorporated by IEEE into a suitable 802.11 protocol. In one embodiment, MB IE 224 includes at least two bits that may be configured to discriminate between types of group traffic, allowing AP 102 to identify whether the queued group traffic is, e.g., multicast data, broadcast data or both. For example, MB IE 224 may be one byte in length, with two bits used to identify the type of group traffic and six bits reserved for other uses.

Figure 3:
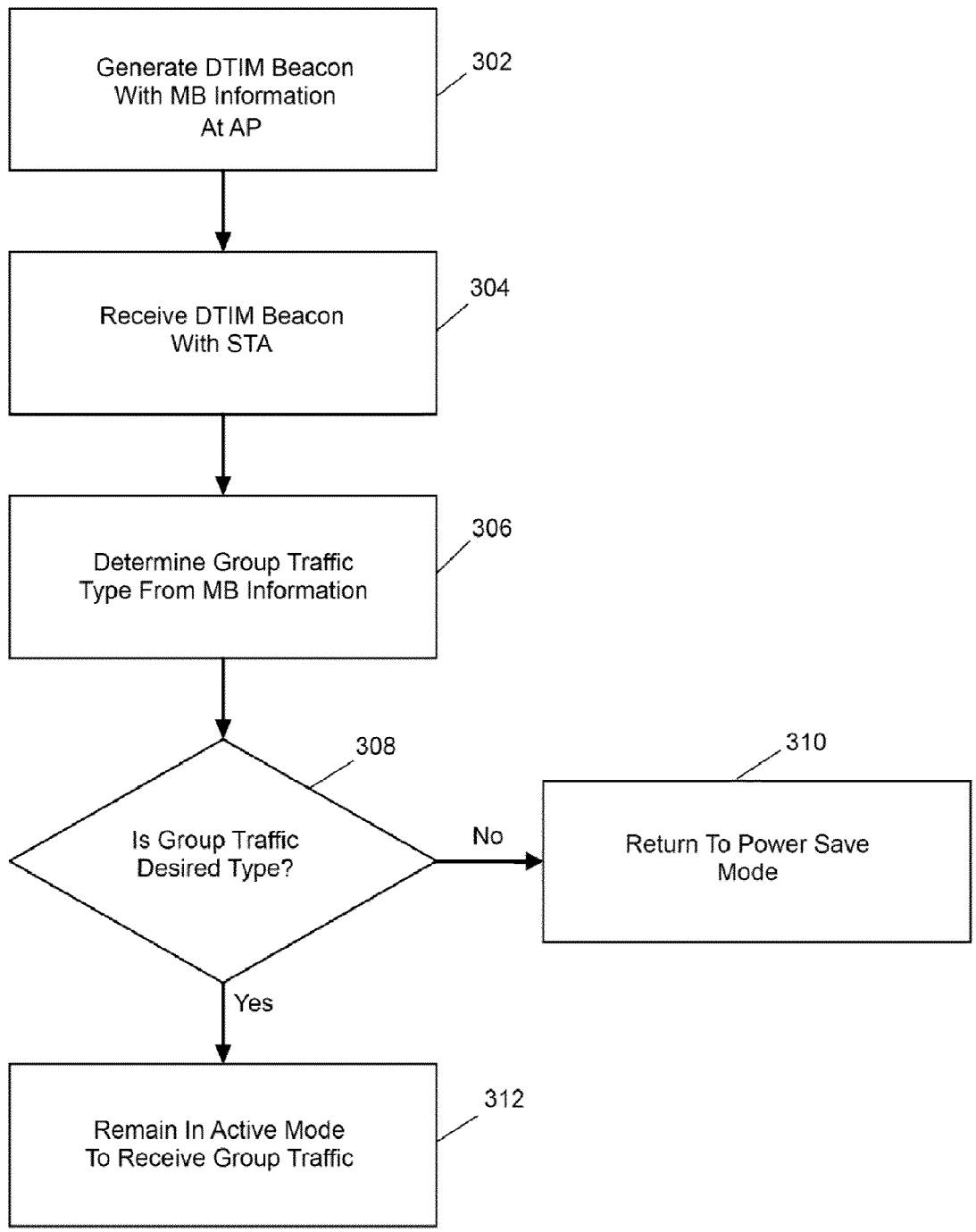
FIG. 3 is a flowchart showing an exemplary routine for transmitting group traffic information, according to one embodiment of the invention.

To help illustrate aspects of the disclosure, one embodiment may be described in reference to the flowchart depicted in FIG. 3. As shown, a suitable routine may involve AP 102 transmitting a DTIM beacon having MB information with beacon generator 106 in step 302. The DTIM beacon may include TIM IE 222 to signal the presence or absence of buffered group traffic and MB IE 224 to identify whether the group traffic, if present, is multicast data, broadcast data or both. Correspondingly, STA 104 may receive the DTIM beacon in step 304. Filter 108 may then determine from the DTIM beacon whether buffered group traffic will be transmitted following the DTIM beacon and whether that traffic is multicast data, broadcast data or both in step 306. Further, STA 104 may be configured to not receive one type of group traffic. As indicated by step 308, when filter 108 determines from the DTIM beacon that the buffered group traffic corresponds to a type of traffic that STA 104 does not currently want to receive, the routine may progress to step 310 and STA 104 may immediately enter a power save mode of operation so as not to receive the subsequent transmission of group traffic from AP 102. Alternatively, if the buffered group traffic corresponds to a desired type of traffic, the routine may flow to step 312, with STA 104 remaining in active mode to receive the subsequent transmissions from AP 102. For example, STA 104 may be configured to filter out multicast traffic so that if filter 108 determines from a DTIM beacon that only multicast data is queued at AP 102, STA 104 may enter power save while if filter 108 determines that broadcast data or that both multicast data and broadcast data are queued at AP 102, STA 104 may remain in active mode to receive the group traffic. Similarly, STA 104 may be configured to filter out broadcast traffic so that if filter 108 determines only broadcast data is queued, STA 104 may enter power save, and remain active if filter 108 determines that multicast data or both multicast data and broadcast data are queued.

Figure 4:
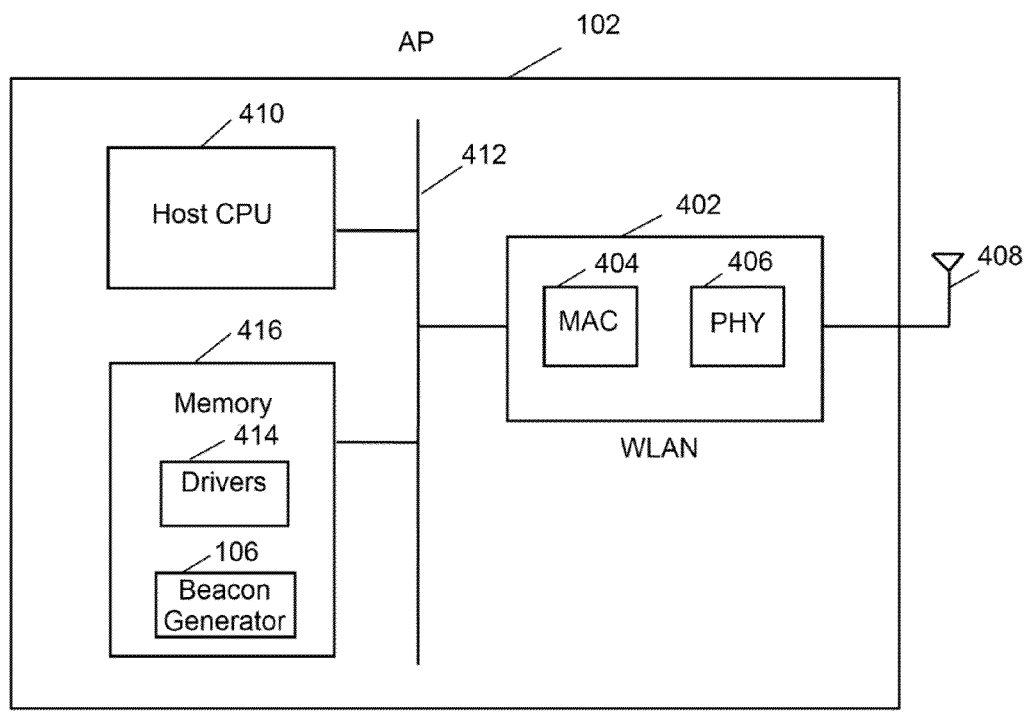
FIG. 4 schematically depicts functional blocks of an access point, according to one embodiment of the invention.

Turning now to FIG. 4, one embodiment of AP 102 is depicted showing principle functional blocks in a high level schematic diagram. Generally, AP 102 may employ an architecture in which the lower levels of the WLAN protocol stack are implemented through firmware and/or hardware in WLAN module 402. WLAN module 402 may therefore include media access controller (MAC) 404 that performs functions related to the handling and processing of frames of data including verification, acknowledgment, routing, formatting and the like. Incoming and outgoing frames are exchanged between MAC 404 and physical layer (PHY) 406, which may include the functions of modulating the frames according to the relevant 802.11 protocol as well as providing the analog processing and RF conversion necessary to provide transmission and reception of wireless signals through antenna 308. While only one antenna 408 is shown for illustration purposes, the AP 102 may include multiple antennas for use in, e.g., transmitting multiple outputs.

AP 102 may also include host CPU 410 configured to perform the various computations and operations involved with the functioning of AP 102. Host CPU 410 is coupled to WLAN module 402 through bus 412, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the WLAN system may be implemented in software as Drivers 414 stored in memory 316 that may be accessed by host CPU 410 over bus 412.

In one aspect, beacon generator 106 may be implemented as processor-readable instructions stored in memory 416 that may be executed by host CPU 410 and may be configured to generate DTIM beacons according to the periodicity advertized by the DTIM count and DTIM period fields of TIM IE 222 (FIG. 2). Further, beacon generator 106 may set a bit of the bitmap control field of TIM IE 222 depending upon the presence or absence of buffered group traffic. Still further, beacon generator 106 may set at least one bit of MB IE 224 to indicate the type of buffered group traffic (e.g., whether buffered group traffic is multicast data, broadcast data or both). In other embodiments, it may be desirable to implement beacon generator 106 in WLAN module 402, such as at the MAC 404 layer.

Figure 5:
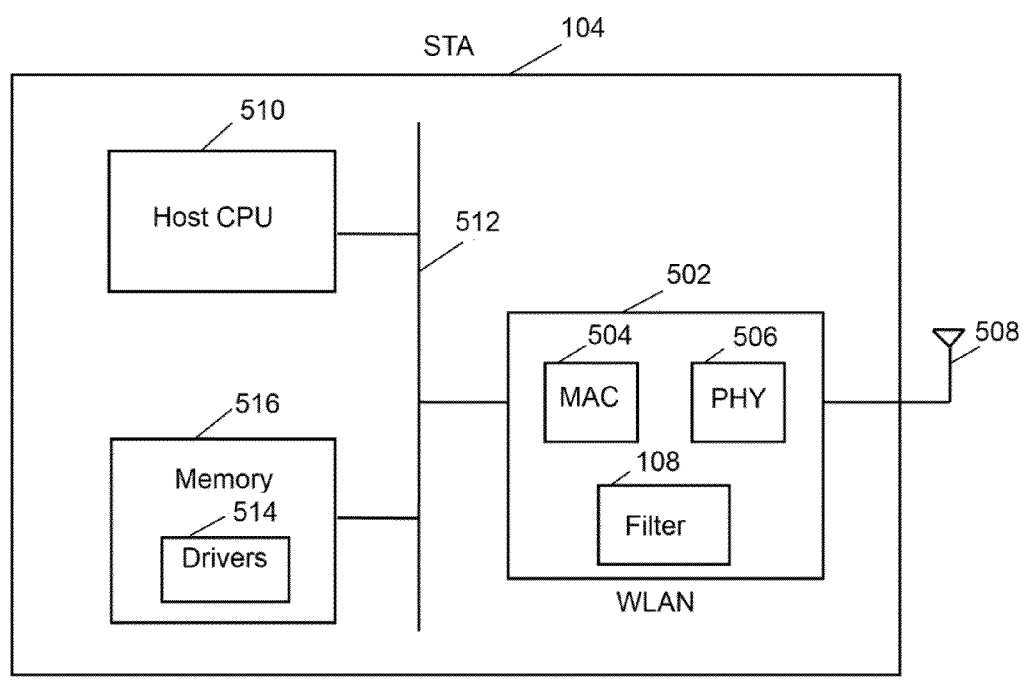
FIG. 5 schematically depicts functional blocks of a station, according to one embodiment of the invention.

In another aspect, one embodiment of STA 104 is depicted in FIG. 5, showing principle functional blocks in a high level schematic diagram. Generally, STA 104 may also employ a similar architecture in which WLAN module 502 includes MAC 504 and PHY 506 coupled to antenna 508. Similar to AP 102, while only one antenna 508 is shown for illustration purposes, STA 104 may include multiple antennas for use in, e.g., receiving multiple inputs. Likewise, STA 104 may include host CPU 510 configured to perform the various computations and operations involved with the functioning of STA 104. Accordingly, host CPU 510 may be coupled to WLAN module 502 through bus 512, as described similarly for AP 102. Upper layers of the protocol stacks of the WLAN system may be implemented in software as Drivers 514 stored in memory 516 that may be accessed by host CPU 510 over bus 512.

Filter 108 may be configured to determine from TIM IE 222 of a received DTIM beacon the presence or absence of queued group traffic at AP 102. Further, filter 108 may also determine from MB IE 224 the type of queued group traffic (e.g., whether the group traffic is multicast data, broadcast data or both). As referenced above, filter 108 may be implemented in one embodiment at the hardware level in WLAN module 502, for example at the MAC 504 layer or the PHY 506 layer. In one embodiment, filter 108 may determine the existence of group traffic and identify its type without involvement of the upper layers of the WLAN protocol stack or host CPU 510. By avoiding activation of these functional elements, STA 104 may minimize power consumption, particularly when filter 108 determines that the buffered group traffic is a type that STA 104 is not configured to receive. However, in other embodiments, it may be desirable to implement filter 108 in software, such as through Drivers 514.

Figure 6:
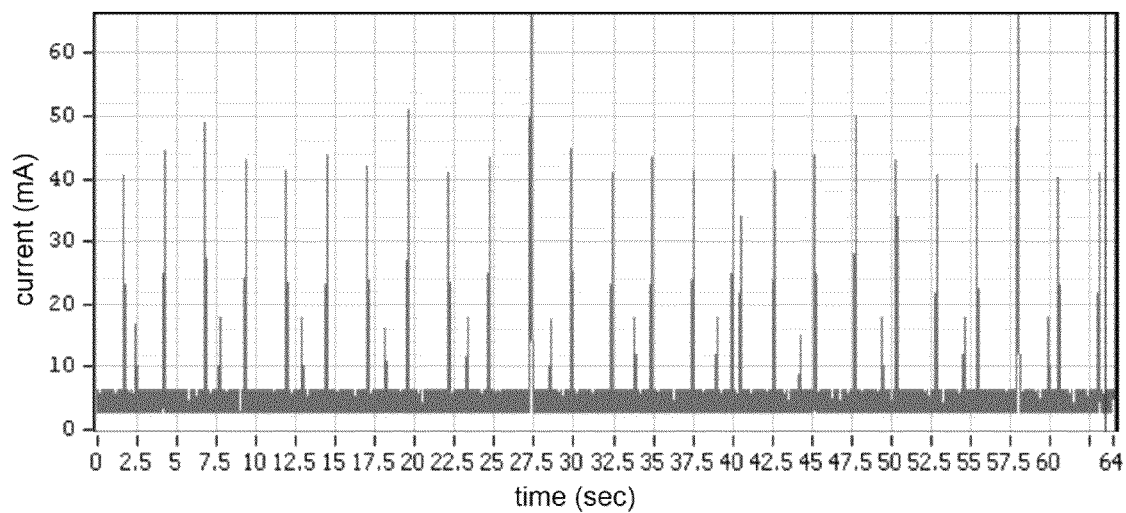
FIG. 6 represents the power consumption of a station, according to one embodiment of the invention.

As described above, the presence of MB IE 224 in DTIM beacons sent by AP 102 allows STA 104 to determine whether buffered group traffic belongs to a type (e.g., multicast or broadcast) that is not to be received by STA 104. Correspondingly, STA 104 may enter a power save state upon determining that the buffered group traffic is of a type that need not be received. Power savings of such behavior is illustrated in FIG. 6, which plots current consumption over time for STA 104 when AP 102 is transmitting multicast data. In the example, AP 102 transmits multicast traffic at a rate of 5 Mbps rate for 1 minute, from time 4 seconds to 64 seconds, and STA 104 is configured to filter multicast traffic. Each spike in current consumption is associated with transmission of a DTIM beacon by AP 102. This represents the entry of STA 104 into an active mode of operation to receive the DTIM beacon. However, as the DTIM beacons contain MB IE 224 identifying the buffered traffic as multicast, filter 108 may determine that the data is not of interest and STA 104 may return to power save mode immediately after reception of the DTIM beacon, without receiving the subsequently transmitted multicast data, as indicated by the return of current consumption to a nominal level. In this example, the total current consumed over the period is approximately 328.61 mA.

Figure 7:
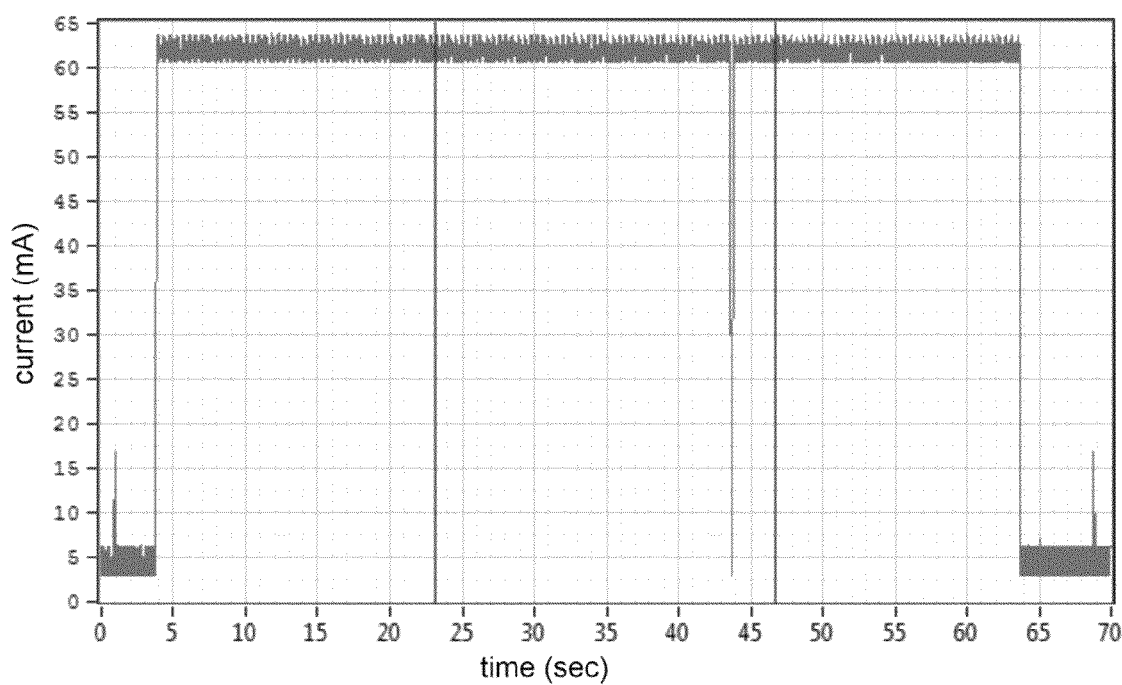
FIG. 7 represents the power consumption of a station operating in a conventional manner.

For comparison, FIG. 7 plots current consumption over time for a conventional wireless communication system employing DTIM beacons that may include TIM IE 222, but not MB IE 224. This example also involves the transmission of multicast data at a 5 Mbps rate for one minute. Further the conventional station may also be configured to filter multicast data. However, since the DTIM beacons provide no distinction between multicast and broadcast data, the conventional station may stay awake to receive the buffered traffic. Only after the traffic is received may the conventional station discard the multicast data. Accordingly, the conventional station remains in an active state for the entire period of multicast transmission. FIG. 7 shows that the current consumed by the conventional station remains at an elevated level for the one minute period, resulting in a total current consumption of approximately 3753.72 mA. Under this example, techniques of this disclosure represent an approximately 90% reduction in power consumed.

Notwithstanding the power savings represented by these techniques may be realized when both AP 102 and STA 104 are configured to generate and recognize MB IE 224, backward compatibility may exist. Since MB IE 224 may be implemented using a vendor-specific information element, stations that are not configured to recognize this IE may ignore the element and function as normal for the station. Likewise, if STA 104 is used in a WLAN managed by a conventional access point, the STA 104 may function as a station not configured to recognize the IE, since the access point may not include MB IE 224 in the DTIM beacons.

Described herein are presently preferred embodiments. However, one skilled in the art that pertains to the present invention will understand that the principles of this disclosure can be extended easily with appropriate modifications to other applications.

What is claimed is:

1. An access point for use in a wireless local area network (WLAN) communication system comprising a beacon generator, wherein the beacon generator is configured to generate a beacon for periodic transmission, wherein the beacon comprises:
   group traffic information indicating whether group traffic is to be transmitted, and multicast/broadcast (MB) information distinguishing which type of group traffic is to be transmitted,
   wherein the MB information allows a station receiving the beacon to determine whether to receive the group traffic to be transmitted.

2. The access point of claim 1, wherein the beacon comprises a delivery traffic indication map (DTIM) beacon to include the group traffic information.

3. The access point of claim 2, wherein the group traffic information comprises one bit of a traffic indication map (TIM) information element (IE).

4. The access point of claim 1, wherein the MB information comprises two bits of an MB information element (IE).

5. The access point of claim 4, wherein the MB information identifies the type of the group traffic as one from the group consisting of multicast data, broadcast data and a combination of multicast and broadcast data.

6. A station for use in a wireless local area network (WLAN) communication system comprising a receiver and a filter,
   wherein the receiver is configured to receive a beacon from an access point comprising:
   group traffic information indicating whether group traffic is to be transmitted, and multicast/broadcast (MB) information distinguishing which type of group traffic is to be transmitted, and
   wherein the filter is configured to determine the type of the group traffic from the MB information.

7. The station of claim 6, wherein the beacon comprises a delivery traffic indication map (DTIM) beacon to include the group traffic information.

8. The station of claim 7, wherein the group traffic information comprises one bit of a traffic indication map (TIM) information element (IE).

9. The station of claim 6, wherein the MB information comprises two bits of an MB information element (IE).

10. The station of claim 9, wherein the filter is configured to identify from the MB IE the type of the buffered group traffic as one from the group consisting of multicast data, broadcast data and a combination of multicast and broadcast data.

11. The station of claim 6, wherein the filter is implemented in hardware.

12. The station of claim 6, wherein the station is configured to enter a power save mode of operation when the filter determines from the MB information that the type of the group traffic is a first type.

13. The station of claim 12, wherein the first type is one from the group consisting of multicast data and broadcast data.

14. A method for a wireless communication system comprising transmitting a beacon comprising group traffic information indicating whether group traffic is to be transmitted and multicast/broadcast (MB) information distinguishing which type of group traffic is to be transmitted,
   wherein the MB information allows a station receiving the beacon to determine whether to receive the group traffic to be transmitted.

15. A method for a wireless receiver, comprising:
   receiving from a transmitter a beacon comprising group traffic information indicating whether group traffic is to be transmitted to the receiver and multicast/broadcast (MB) information distinguishing which type of group traffic is to be transmitted; and
   determining from the MB information the type of the group traffic.

16. The method of claim 15, wherein the beacon comprises a delivery traffic indication map (DTIM) beacon to include the group traffic information.

17. The method of claim 16, wherein the group traffic information comprises one bit of a traffic indication map (TIM) information element (IE).

18. The method of claim 15, wherein the MB information comprises two bits of an MB information element (IE).

19. The method of claim 15, wherein determining the type of the group traffic comprises identifying the type as one from the group consisting of multicast data, broadcast data and a combination of multicast and broadcast data.

20. The method of claim 15, further comprising:
   determining from the MB information that the group traffic is a first type; and placing the wireless receiver in a power save mode of operation in response to determining the type of the group traffic as the first type.

* * * * *